Oct. 7, 1941.  J. A. HUMPHREYS  2,258,183
METER LOCK
Filed Sept. 18, 1940

Inventor
Joseph A. Humphreys by Ezekiel Wolf
Attorney

Patented Oct. 7, 1941

2,258,183

UNITED STATES PATENT OFFICE 2,258,183

METER LOCK

Joseph A. Humphreys, Egypt, Mass.

Application September 18, 1940, Serial No. 357,192

5 Claims. (Cl. 73—272)

The present invention relates to a locking device, and in particular to one in which the locking is accomplished without the use of a key and which normally cannot be unlocked.

The present invention is particularly adaptable to the locking of fixed elements, and more particularly to devices such as water meters installed in pipe lines. In most cities and communities, water is charged according to the amount used, and for this purpose, meters are usually placed on the premises in the main supply line. It is also usual to send around at periodic intervals, meter readers, to take meter readings from which the amount of water used, is determined by simply deducting the previous reading from the newest reading. Most of the meters are supplied with a seal so that the cover and the meter register cannot be removed without breaking the seal. However if such seals are broken they may be readily replaced, and frequently, because the meter is in a dark place in the cellar, the reader does not notice in reading the register whether the meter seal has or has not been broken or tampered with. After the seal is once broken, it is a comparatively simple matter to twirl the hands of the meter register backwards and thereby register a low and false reading.

A number of different means have been tried to make it difficult or impossible to remove the meter register, but most of these devices are operated with keys which are easily duplicated. In addition to this the use of a lock and locking mechanism with a key is comparatively expensive, and where the meter in most cases is manufactured at a very low cost, the lock mechanism adds an appreciable expense to the cost of the meter. Further than this, there are at present a great number of water meters in use, and it is highly desirable to find a protective device which may be applied to these meters without removing the meter or changing its construction in any way.

The present invention overcomes these disadvantages which have been mentioned above in other types of construction, and provides further desired advantages as outlined in the previous discussion.

In the present invention the locking device is permanent and cannot be removed after it is once installed without the removal of the meter itself. The locking device however may be installed on old meters, using the same registers and the same meter with the addition only of one element to the register which may be applied to the type of register customarily used and of another element applied to the cup beneath the register that is usually present in all types of water meters.

These features above described not only make it impossible to tamper with the meter, but also make it possible to effect rapid installation of the device at a very low total cost.

The present invention will be more fully described in connection with the specifications given below and the drawing showing an embodiment of the invention, in which.

Figure 1:
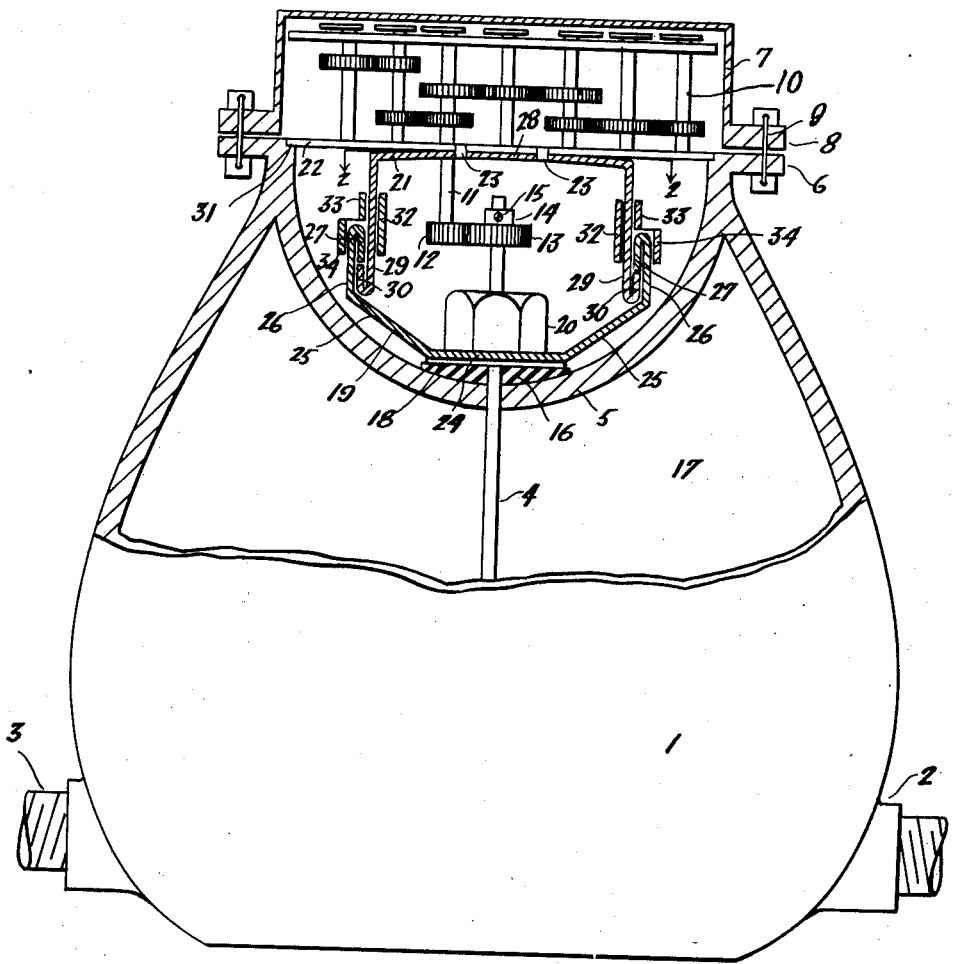
Figure 1 shows a front elevation of a water meter partly in section illustrating the present invention.
Figure 2:
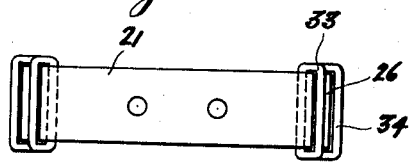
Figure 2 shows a section taken on the line 2—2 of Figure 1.

In the drawing, 1 illustrates the usual meter with inlet and outlet connections 2 and 3, and a meter spindle 4 rotated by the flow of water for measuring the amount of water which passes through the meter. The spindle 4 passes through the partition 5 formed as a cup extending downward from the top of the meter. At the top of the meter are usually ears 6 to which the cover 7 is attached through the flange 8. A seal is usually provided which must be broken in order to remove the cover 7 and the register mechanism 10 from the meter. In the ordinary construction the register 10 is provided with a spindle 11 projecting into the cup formed by the partition 5. This spindle has at its end a gear 12 which meshes with a gear 13 pinned to the shaft 4 in the collar 14 by means of the set screw 15. At the base of the cup 5 surrounding the spindle 4, is a washer 16 which prevents water from the space 17 from going up through the cup to the meter register. Positioned over this washer which may be of rubber, leather, or other material, may be a metal washer 18, over which is placed the member 19, which will be more fully described later, both elements being held in place by the nut 20 which threads on the shaft 4. A second member 21 is fastened to the bottom plate 22 of the meter register by means of the rivets 23, 23 or screws if desired. The members 19 and 21 are shown in section in Figure 1, and comprise a metal strip having substantial springiness and composed of a base section 24 beneath the nut 20 and two upwardly extending sections 25, 25, continuing from the portion 24, and themselves merging into vertical sections 26, which have turned-in end sections 27, 27, lying flat against the vertical members 26. The top element 21 is also of spring material and comprises a central substantially flat section 28 with vertical downwardly extending sections 29, 29, and upturned ends 30 lying flat against the ends 29. The ends 30 it will be noted are turned outwards, whereas the ends 27 of the lower members are turned inward. The direction of these pieces may be reversed by reversing the outside and inside position of the vertical ends.

In the position of these members shown in Figure 1, they have been snapped in place simply by pressing the register 10 down upon the seat 31. It will be seen that in the position indicated in Figure 1, after the register has been snapped down in position, it cannot be raised upward, since the ends of the elements 27 and 30 lock against one another, these ends having horizontal opposing surfaces, not numbered in the drawing, which bear against each other.

In order to prevent the register from being raised, it is further necessary to make it impossible to rotate the members 27 out of engagement with the members 30, which would then make it possible to remove the register. This is accomplished by providing ring members 32 which are fixed freely but permanently about the vertical downwardly extending arms 29. These ring members 32 have a collar portion 33 fitting around the member 29 and a lower large ring member 34, which in a locking position passes about both the members 29 and 26 and also the in-turned end element 27. Initially before the two elements are locked in position, the ring 33 lies over and in line with the outwardly turned element 30. As the register is forced downward in position, the ring 32 is pushed upward by the lower member 19 as the inwardly turned ends 27 meet the lower edge of the ring 33. The lower loop or ring 34 at the same time passes around the elements 26 and 27 and locks the two members 19 and 21 together. The nut 20 holds the elements 19 in place so that the register can neither be turned nor raised in the position shown in Figure 1.

If the register must be removed the entire meter must first be disconnected from the pipe line by breaking the connections 2 and 3. When the meter has been removed, the register may be taken out first by removing the cover 7 and then turning the meter up-side down, which drops the ring 32 and frees the member 19 from the member 21, permitting the register to be rotated in the up-side-down position of the meter. The members 19 and 21 are thereby disengaged and the register may then be removed from the meter.

It will be evident from the construction described above that the elements 19 and 21 may be applied to the meter without changing the construction of the meter itself and that in the ordinary installation of the register 10 it may be removed and the element 21 applied thereto by riveting or screwing it to the base of the register by means of the rivets 23 or by other suitable means. Other means of attachment may of course be used. The element 19 however may be applied directly to the meter without the removal of the meter from its position in the house. To do this the register is first removed, and then the collar 14 carrying the gear 13. After this, the nut 20 may be removed and the member 19 inserted in place, whereupon the nut 20 may be replaced holding the member 19 sufficiently tight to prevent rotation, and the register 10 simply forced down in the position shown in Figure 1.

The form of the members 19 and 21 may be varied somewhat in construction and so also the lock engaging elements 27 and 30. For instance the elements 27 and 30 may simply be strips welded respectively to the vertical members 26 and 29, or the vertical end members may be cast or pressed pieces attached to the members 19 and 21, which may have sufficient elasticity so as to allow the elements to be sprung in position.

While these forms of the invention may be employed, I have found the construction illustrated in the drawing as the simplest, cheapest, and most readily made and used.

Having now described my invention, I claim:

1. In combination with a water meter adapted to be permanently installed in a water main, the meter having a removable register mounted at the top thereof, a chamber beneath said register and a spindle driving said register, said spindle projecting into said chamber beneath said register, a set of U shaped spring members, means mounting one of said U shaped members in an inverted position on the base of said register in said chamber, means mounting the other of said members at the base of said chamber, catch means provided on the prongs of said members for locking one with the other to restrain vertical motion, and means cooperating therewith for preventing rotary motion of one of said members with respect to the other.

2. In combination with a water meter adapted to be permanently installed in a water main, the meter having a removable register mounted at the top thereof, a chamber beneath said register and a spindle driving said register, said spindle projecting into said chamber beneath said register, a set of U shaped spring members, means mounting said spring members concentric with said register, one of said members being mounted in a fixed position in said chamber and the other in an inverted position on the base of said register, catch means provided on the prongs of said U shaped members for interlocking one with the other against vertical motion and means cooperating with said prong elements of said members for preventing rotary motion of one of said members with respect to the other.

3. In combination with a water meter adapted to be permanently installed in a water main, the meter having a removable register mounted at the top thereof, a chamber beneath said register and a spindle driving said register, said spindle projecting into said chamber beneath said register, a set of U shaped spring members mounted concentrically one in an inverted position to the base of the register and the other in an upright position on the base of said chamber, the prongs of said U shaped members having outwardly and inwardly projecting elements respectively, whereby said prongs may be interlocked, and ring means mounted freely on said inverted U shaped member and adapted to fall in position surrounding the prongs of said U shaped members when they are interlocked with each other.

4. In combination with a water meter adapted to be permanently installed in a water main, the meter having a removable register mounted at the top thereof and driven by a spindle projecting through said meter, means concealed beneath the register comprising two parts, one attached to said register and the other to said meter, said parts being adapted to engage each other when said register is put into said meter and means operative upon the engagement of said parts with each other for preventing disengagement in any but an inverted position of said meter.

5. In combination with a water meter adapted to be permanently installed in a water main, the meter having a removable register mounted at the top thereof and driven by a spindle projecting through said meter, means concealed beneath the register comprising two parts, one attached to said register and the other to said meter, said parts being adapted to interlock with each other when they are moved into engagement in the direction of the spindle axis, and means operative upon the engagement of said parts with each other for preventing movement of said parts in a plane perpendicular to said spindle except with said meter in an inverted position.

JOSEPH A. HUMPHREYS.